(12) United States Patent
Silari et al.

(10) Patent No.: US 9,977,134 B2
(45) Date of Patent: May 22, 2018

(54) PORTABLE RADIATION DETECTION DEVICE FOR OPERATION IN INTENSE MAGNETIC FIELDS

(71) Applicants: CERN—EUROPEAN ORGANIZATION FOR NUCLEAR RESEARCH, Génèva (CH); POLITECNICO DI MILANO, Milan (IT)

(72) Inventors: Marco Silari, Thoiry (FR); Alberto Fazzi, Milan (IT); Vincenzo Antonio Varoli, Milan (IT)

(73) Assignees: CERN—EUROPEAN ORGANIZATION FOR NUCLEAR RESEARCH, Génèva (CH); POLITECNICO DI MILANO, Milan (IT)

( * ) Notice: Subject to any disclaimer, the term of this patent is extended or adjusted under 35 U.S.C. 154(b) by 0 days. days.

(21) Appl. No.: 15/313,496

(22) PCT Filed: May 11, 2015

(86) PCT No.: PCT/EP2015/060371
§ 371 (c)(1),
(2) Date: Nov. 22, 2016

(87) PCT Pub. No.: WO2015/180952
PCT Pub. Date: Dec. 3, 2015

(65) Prior Publication Data
US 2017/0199284 A1 Jul. 13, 2017

(30) Foreign Application Priority Data
May 27, 2014 (EP) .................................. 14170108

(51) Int. Cl.
*G01T 1/208* (2006.01)
*G01T 1/20* (2006.01)

(52) U.S. Cl.
CPC ............ *G01T 1/2018* (2013.01); *G01T 1/208* (2013.01)

(58) Field of Classification Search
CPC .............................. G01T 1/208; G01T 1/2018
See application file for complete search history.

(56) References Cited

U.S. PATENT DOCUMENTS

| 6,510,336 B1* | 1/2003 | Daghighian | ............ G01T 1/161 |
| | | | 250/370.06 |
| 2003/0105397 A1* | 6/2003 | Tumer | .................. G01T 1/2985 |
| | | | 600/436 |
| 2009/0140153 A1 | 6/2009 | Flamanc et al. | |

FOREIGN PATENT DOCUMENTS

| WO | 0167133 A2 | 9/2001 |
| WO | 2005005381 A2 | 1/2005 |

(Continued)

OTHER PUBLICATIONS

Dhawan S et al: "Commercial Buck Converters and Custom Coil Development for the Atlas Inner Detector Upgrade", IEEE Transactions on Nuclear Science, IEEE Service Center, New York, NY, US, vol. 57, No. 2, Apr. 1, 2010 (Apr. 1, 2010), pp. 456-462, ??011307391, ISSN: 0018-9499 p. 459, lines 1-6, paragraph III.

(Continued)

*Primary Examiner* — David Porta
*Assistant Examiner* — Faye Boosalis
(74) *Attorney, Agent, or Firm* — Lerner, David, Littenberg, Krumholz & Mentlik, LLP

(57) ABSTRACT

A portable radiation detection device with a detector unit comprising a scintillator with an array of avalanche photodiodes allows to reliably detect incident ionizing radiation or (Continued)

radiation contamination in the presence of intense magnetic fields of 0.1 Tesla and above.

19 Claims, 3 Drawing Sheets

(56) References Cited

FOREIGN PATENT DOCUMENTS

WO  2012023855 A1  2/2012
WO  2012147034 A1  11/2012

OTHER PUBLICATIONS

International Search Report for Application No. PCT/EP2015/060371 dated Oct. 27, 2015.

* cited by examiner

PORTABLE RADIATION DETECTION DEVICE FOR OPERATION IN INTENSE MAGNETIC FIELDS

CROSS-REFERENCE TO RELATED APPLICATIONS

The present application is a national phase entry under 35 U.S.C. § 371 of International Application No. PCT/EP2015/060371, filed May 11, 2015, which claims priority from EP Application No. 14170108.6, filed May 27, 2014, all of which are hereby incorporated herein by reference.

FIELD OF THE INVENTION

The invention relates to a portable device for radiation detection and radiation measurement (such as a survey meter) which may be operated in external magnetic fields.

BACKGROUND AND PRIOR ART

Portable devices for radiation detection and radiation measurement are used in many different fields to check personnel, equipment and facilities for radioactive contamination, or to detect and measure external or ambient ionizing radiation. Common instruments for these purposes comprise Geiger-Müller tubes and scintillation counters. A Geiger-Müller tube comprises a chamber filled with an inert gas, in which free electrons are produced in response to incident ionizing radiation. The electrons propagate in an electrical field and trigger an electric discharge avalanche which may then be detected at the anode. A scintillation counter, in contrast, comprises a scintillator crystal in which photons are generated in response to incident radiation. A sensitive photomultiplier tube is coupled to the scintillator, where electrons are generated by means of the photoelectric effect and are then amplified into an avalanche of electrons that can be read out and detected.

However, both detection techniques require the drifting of charged particles over relatively long distances, and are hence sensitive to external magnetic fields. For this reason, these devices are not well-suited to provide reliable measurement results in environments with high magnetic fields, such as in the spatial vicinity of research or medical particle accelerators. Similar problems are encountered when performing radiation surveys at medical magneto-resonance imaging (MRI) operated in multimodality with positron emission tomography (PET) instrumentation, or magnetic separation in industrial mineral processing.

A radiation dose meter for measuring a radiation dose in an external magnetic field is described in International Patent Publication WO 2012/023855 A1, and comprises an alignment unit capable of precisely aligning the radiation dose meter in the external magnetic field so that the path of the charged particles inside the radiation dose meter is substantially parallel to the direction of the external magnetic field and no deviation occurs. However, the device requires a precise detection of the spatial orientation of the external magnetic field, and the alignment unit additionally adds to the bulkiness and complexity of the device.

What is needed is a simple and compact radiation detection device that can be operated reliably even in intense and varying magnetic fields.

OVERVIEW OF THE INVENTION

This objective is achieved with a portable radiation detection device comprising a detector unit comprising a scintillator and a photomultiplier coupled to said scintillator, said photomultiplier comprising an array of avalanche photodiodes; a control unit comprising control circuitry electrically coupled to said photomultiplier.

A portable radiation detection device in accordance with the present invention comprises a detector unit with a scintillator and with a photomultiplier coupled to said scintillator, said photomultiplier comprising an array of avalanche photodiodes. The radiation detection device further comprises a control unit comprising control circuitry, electrically coupled to said photomultiplier.

The inventors found that a scintillator coupled to an array of avalanche photodiodes allows for a reliable detection of ionizing radiation even in the presence of high magnetic fields. Avalanche photodiodes allow converting photons generated in the scintillator by incident ionizing radiation into an avalanche of electrons by impact ionization in the semiconductor substrate. The plurality of avalanche photodiodes in the array may be connected sequentially and on a common semiconductor substrate. Such a configuration is sometimes called a silicon photomultiplier, or a multi-pixel photon counter, or a semiconductor Geiger mode avalanche photodiode.

In contrast to conventional photomultiplier tubes that comprise an array of electrically charged dynode plates and generate an avalanche pulse of electrons that cascade down the dynode plates, avalanche photodiodes are largely insensitive to external magnetic fields. The portable radiation detection device according to the present invention can hence be employed even in environments where strong magnetic fields are present, such as in the vicinity of particle accelerators or magnetic resonance imaging/positron emission tomography scanners. The configuration of the present invention with a scintillator coupled to a semiconductor photomultiplier at the same time permits a compact and robust design, which makes the radiation detection device very well-suited for handheld radiation survey meters for use in mobile applications.

Said photomultiplier may be directly connected to or in physical contact with said scintillator.

In the sense of the present invention, an intense magnetic field may be understood to denote a magnetic field with a magnetic flux density of 0.1 Tesla or more.

Said photomultiplier may be adapted to output a current pulse signal in response to ionizing radiation incident on said scintillator.

The control unit may be adapted to receive said current pulse train signal, and to convert said current signal into an output signal representative of the incident radiation. Said output signal may in particular represent the number of counts or a count rate, or may represent a dose or a dose rate of said incident radiation.

Said array of a plurality of avalanche photodiodes may be a silicon photomultiplier.

The portable radiation detection device allows detection of various types of ionizing radiation, comprising alpha, beta, X-rays and gamma radiation in a wide range of energies. This may be achieved by employing specific probes.

In particular, said detector unit and/or said control unit may be adapted to detect gamma ionizing radiation at an energy range of 45 keV or more, and/or at an energy range of 1.3 MeV or less.

In a preferred embodiment, the scintillator comprises lanthanum bromide as scintillator material.

Lanthanum bromide has a low natural radioactivity, a very fast decay time and a high yield in terms of the number of generated photons per deposited energy. The inventors found that this combination of features makes lanthanum bromide an excellent scintillator material for use in intense magnetic fields in the present application.

Other organic or inorganic scintillator materials such as CsI, BGO or plastic, can be used as well.

In a preferred embodiment, said detector unit and/or said control unit do not comprise ferromagnetic material. By reducing the amount of ferromagnetic material, interference of the device operation with an external magnetic field may be minimized.

In a preferred embodiment, the detector unit comprises an amplifier circuit electrically coupled to an output of said photomultiplier, in particular a current-feedback operational amplifier. In a preferred embodiment, the gain of the amplifier circuit is in the range of 3 to 30 dB.

In a preferred embodiment, said detector unit further comprises a filter unit coupled to an output of said amplifier circuit.

Said filter unit may comprise an AC-coupled low-pass filter, preferably a Sallen-Key filter. The filter may also comprise a passive differentiator.

In a preferred embodiment, said detector unit further comprises a discriminator unit electrically coupled to an output of said filter unit. The discriminator may be a fast comparator with hysteresis.

The discriminator unit may also comprise a digital pulse stretcher or serve as a digital pulse stretcher.

In a preferred embodiment, said control unit comprises a high-voltage power supply unit, wherein said high-voltage power supply unit preferably comprises a voltage multiplier circuit, and wherein said detector unit preferably comprises a low-drop voltage regulator unit coupled to said voltage multiplier circuit.

In a preferred embodiment, said voltage multiplier circuit comprises a voltage multiplier cascade, in particular a voltage multiplier ladder network comprising capacitors and diodes, preferable a Cockcroft-Walton circuit.

The inventors found that charge pump-based power supply circuits are particularly useful in the context of the present invention due to their insensitivity to the influence of an external magnetic field. A high-voltage power supply unit according to the embodiments discussed above allows provision of a stable bias voltage without relying on magnetic elements like inductors or transformers that are widely used in conventional DC-DC converters.

Said high-voltage power supply unit may be battery-powered. A Pb battery was found particularly advantageous for use in high magnetic fields.

The combination of a battery power supply with charge pump-based supply circuitry allows provision of the entire power supply without relying on magnetic elements, and hence avoids interferences when the detection device is employed in high magnetic background fields.

Said control circuitry may comprise a counter unit electrically coupled to said photomultiplier. A microcontroller unit may be coupled to said counter unit. The counter unit may also be integrated into the microcontroller unit.

In a preferred embodiment, said control unit comprises a display unit, wherein said display unit may preferably comprise an LED display unit.

The display unit may display the output signals representative of the incident radiation, such as a dose or a dose rate of the incident radiation, and possibly further operational parameters.

The inventors found that an LED display is particularly insensitive to high magnetic fields, and is hence preferred as a reliable display unit when the device is used in a magnetic environment.

In a preferred embodiment, said display unit may additionally comprise an LCD display unit, which may be used to display the output signals and/or further operational parameters when the radiation detection device is not exposed to strong magnetic fields. An LCD display is particularly power-efficient.

Said control circuitry may be adapted to actuate either said LCD display unit or said LED display unit to display an output signal representative of the incident radiation depending on whether or not an external magnetic field with a magnetic field strength or induction above a certain threshold is detected. In this configuration, the portable radiation detection device may hence comprise a magnetic field detector.

The inductance magnetic field near the radiation active probe may be sensed by means of a Hall Effect probe and measured by a proper circuit. The measurement may be transmitted to the control unit for monitoring.

Said control unit may comprise an external data interface.

In a preferred embodiment, said detector unit and said control unit are separate units, and they may be connected via an electric cable connection for a power supply and/or data transfer.

Providing the detector unit and the control unit as separate units may facilitate the handling of the device. The detector unit comprising the scintillator and photomultiplier can be provided as a small handheld unit, whereas the control unit comprising the control circuitry, power supply and display unit may be provided in a different unit that could for instance be carried at a user's belt.

DETAILED DESCRIPTION OF PREFERRED EMBODIMENTS

The features and numerous advantages of the present invention will best become apparent from a detailed description of preferred embodiments with reference to the accompanying drawings, in which.

Figure 1:
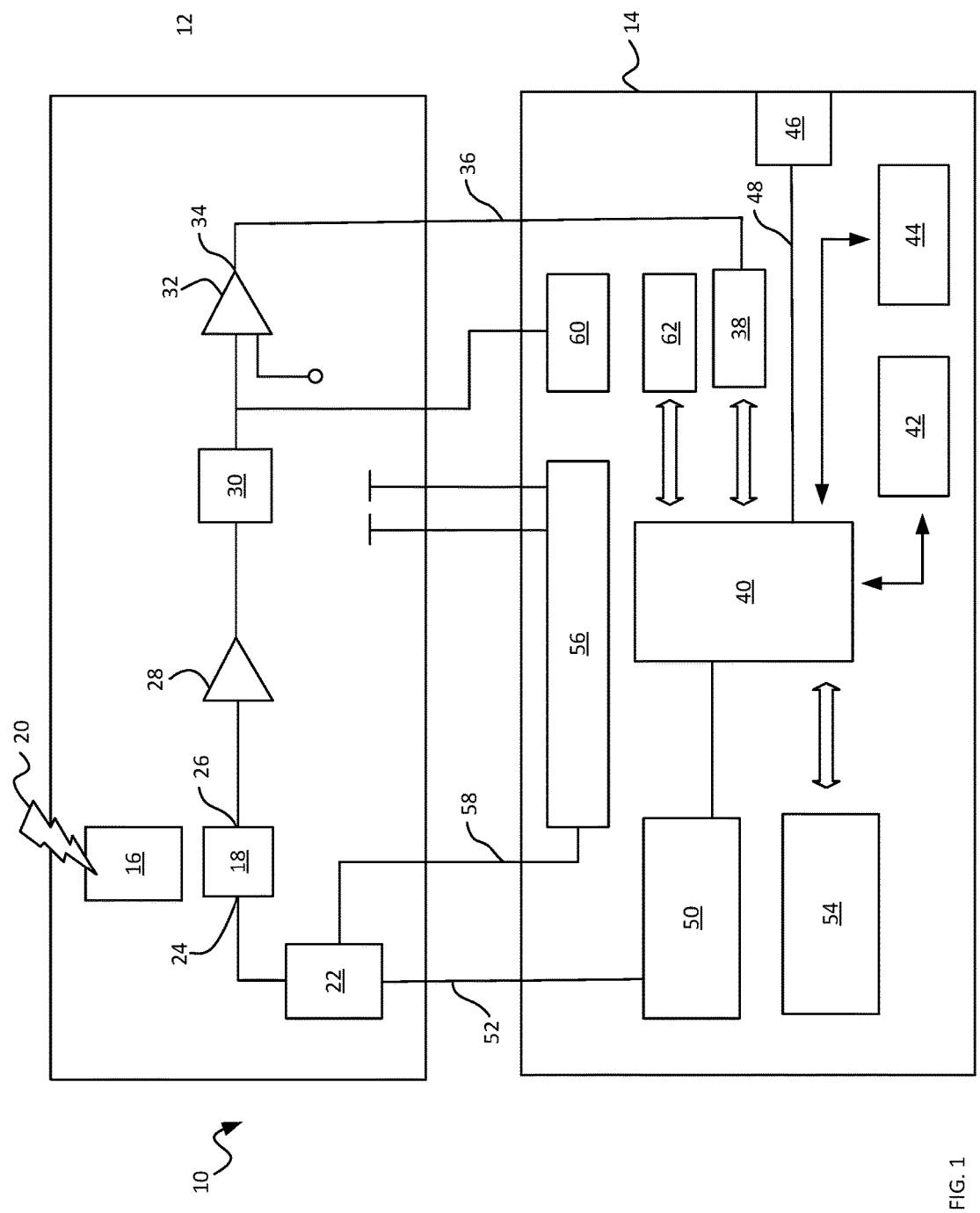
FIG. 1 is a schematic circuit diagram of a portable radiation detection device according to an embodiment of the present invention.

FIG. 1 is a schematic circuit diagram of a portable radiation detection device 10 according to an embodiment of the present invention. The detection device 10 may be a survey meter comprising a hand-held detector unit or probe unit 12 and a control unit or readout unit 14. In the embodiment of FIG. 1, the detector unit 12 and the control unit 14 are separate units that are connected by electric cable connections for data transfer and voltage supply. In this configuration, the detector unit 12 may be used as a probe with which a user scans apparatuses or surfaces for radioactivity, whereas the bulkier control unit 14 may be worn at a user's belt. However, the invention is not limited to devices with separate units, but may as well comprise a survey meter 10 in which the detector unit 12 and the control unit 14 are integrally formed in a common body.

The detector unit 12 comprises a scintillator crystal 16 coupled to a silicon photomultiplier 18 comprising an array of avalanche photodiodes (not shown) that are sequentially connected on a common silicon substrate (not shown). The silicon photomultiplier 18 is provided in direct physical contact with the scintillator crystal 16. The coupling between the scintillator crystal 16 and the silicon photomultiplier 18 may be established by means of a micro-package made of plastic resin that covers and protects the silicon chip while allowing optical coupling, but other ways of coupling between the scintillator crystal 16 and the silicon photomultiplier 18 may be employed as well.

Incident ionizing radiation 20, which is represented by a flash arrow in FIG. 1, will generate photons in the scintillator crystal 16, and the generated photons will impinge on a fraction of avalanche photodiodes in the array of photodiodes in the silicon photomultiplier 18, where they will generate electrons by means of the photoelectric effect. Every avalanche photodiode in the silicon photomultiplier operates in the Geiger mode and they add their current pulses to produce an accumulated signal at the output.

In a preferred embodiment, the scintillator crystal 16 is made from Lanthanum bromide, $LaBr_3$. The inventors found that this material is very well-suited for use in a portable radiation detection device 10 due to the low natural activity of the lanthanum, the fast decay time equal to 16 ns, and the high light yield of 65 photons per deposited keV of energy. The emission peak of $LaBr_3$ is around 380 nm. Lanthanum bromide is hydgroscopic and should hence be encapsulated.

However, the invention is not limited to lanthanum bromide as a scintillator material, and other suitable materials may be used as well.

Silicon photomultipliers 18 that can be used in the context of the present invention are commercially available from, among others, Hamamatsu, SensL, FBK and STMicroelectronics.

As an advantage, the small dimensions of the silicon photomultiplier 18 permit a compact, light and robust design of the detector unit 12. In one exemplary configuration, the inventors chose a silicon photomultiplier 18 with dimensions of about 4 mm×4 mm comprising 3600 individual avalanche photodiodes. The microcell pitch is 60 µm, whereas the microcell capacitance amounts to 170 fF and the quenching resistance amounts to approximately 350 kΩ. This exemplary silicon photomultiplier 18 has a breakdown voltage of approximately 28 V and a dark current in the range of 200 pA before breakdown. The dark current denotes the average current value flowing in the silicon photomultiplier 18 even in the darkness of the device due to single microcell breakdown or leakage current. The occurrence rate of the microcell firing is the dark current rate which may depend on the bias voltage of a breakdown, the overvoltage OV, and on the temperature.

The detector circuitry will now be described with reference to FIG. 1. The detector unit 12 comprises a bias voltage regulator 22 that provides a bias voltage in the range of 28 to 33 V for the silicon photomultiplier 18. The bias voltage is provided at a bias voltage input 24 of the photomultiplier 18. At a photocurrent signal output 26, the silicon photomultiplier 18 provides the current signal generated by amplification of the detector signal in the chain of avalanche photodiodes. The current signal is provided to an amplifier 28, which may be a low noise and large bandwidth amplifier with a gain in the range of 3 to 30 dB. The amplifier 28 may be a current-feedback operational amplifier, such as an AD8000 with an amplifier bandwidth of about 300 MHz.

The inventors found that DC- and AC-coupled large bandwidth amplifiers may largely improve the signal-to-noise ratio.

As can be further taken from the circuit diagram of FIG. 1, the output of the large-bandwidth amplifier 28 is provided to a filter 30, which may be an AC-coupled low-pass filter with three real coincident poles and a time constant as short as 30 ns. The inventors found that good results can be obtained with a second-order Sallen-Key filter and a passive differentiator.

The filtered signal is provided from the filter 30 to a discriminator 32, which is a fast comparator with hysteresis and doubles as a digital pulse stretcher. The discriminator 32 provides as an output a digital pulse train 34 that is sent via a data connection 36, such as a cable connection, to a counter unit 38 provided in the control unit 14. The counter unit 38 provides the data to a microcontroller 40 for further processing. The microcontroller 40 may be a commercially available microchip controller, such as a controller belonging to the "PIC 18" family.

The microcontroller 40 may process the acquired data to distinguish between different types of acquired radiation, or to convert the acquired counts or count rates into a dose or dose rate. The acquired data may be displayed at a display unit which may comprise both an LCD display unit 42 and an LED display unit 44. The inventors found that an LCD display unit 42 is usually preferable as a display due to its low power consumption. However, an LCD display unit may be unsuitable in high magnetic fields and may become "frozen" at magnetic inductions in the range of 1 Tesla or even less. The inventors found that an LED display unit 44 is insensitive to magnetic fields, and hence is well-versed to display radiation readings even in intense magnetic backgrounds.

In an embodiment of the present invention, the LCD display unit 42 and the LED display unit 44 may be employed selectively and alternately, depending on whether or not the survey meter 10 is placed in high magnetic fields. For instance, the control unit 14 may comprise a magnetic detector unit (not shown) to detect and measure the strength of an external magnetic field. If the detected magnetic field is larger than a pre-determined threshold, the LCD display unit 42 may be deactivated automatically, and the LED display unit 44 may be used instead to display radiation readings. If the magnetic field falls below the pre-determined threshold, for instance if the user changes his position and moves away from the source of the magnetic field, the control unit 14 may automatically switch the display back from the LED display unit 44 to the LCD display unit 42 to reduce the power consumption.

The microcontroller 40 is further connected with a data interface 46 via a data interface connection 48. The data interface 46 may be a USB port, or any other data interface that may be used to export the data collected in the control unit 14 to an external device.

The control unit 14 further comprises a power supply unit 50 for power supply of both the various components of the control unit 14 and of the handheld detector unit 12, via a power cable connection 52. The power supply unit 50 is controlled by the microcontroller 40 via a battery monitor and recharger circuit 54.

The power supply unit 50 is preferably battery-powered. The inventors found that Pb accumulators are particularly well-suited due to their insensitivity to high magnetic fields. Provision of the detector bias voltage (typically in the range of 28 to 33 V) then requires an up-conversion in the power supply unit 50, which may be achieved by means of a voltage multiplier circuit of the Cockcroft-Walton type. This is a charge pump-based power supply circuit which does not use any magnetic elements, such as inductors or transformers found in conventional DC-DC converters. Avoidance of magnetic elements and ferromagnetic material in the survey meter 10 reduces the sensitivity to external magnetic fields.

The high-voltage power supply unit 50 comprising the Cockcroft-Walton voltage multiplier provides the output voltage to the handheld detector unit 12 via the power cable connection 52. The detector bias voltage for the silicon photomultiplier 18 is then obtained in the bias voltage regulator 22 by low-drop regulation.

The control unit 14 further comprises a voltage regulator 56. The voltage regulator 56 supplies supply voltages +5V/−5V for the analog circuits, and the supply voltage +5V for the digital circuits. The voltage regulator 56 further provides, via a voltage supply line 58, a programmable voltage reference to the bias voltage regulator 22. This allows an indirect gain control that the inventors found very useful in testing and calibrating.

The combination of components as described above provides a survey meter 10 that allows to reliably detect and measure incident radiation in external magnetic fields of up to 1 Tesla or even more. In particular, by combining a semiconductor photomultiplier 18 that employs avalanche photodiodes instead of standard photomultiplier tubes in combination with charge pump-based power circuits, the device is remarkably insensitive to external magnetic fields. The use of Pb accumulators as an electrical power source in combination with high frequency quartz for oscillating circuits and an LED display in addition to a conventional LCD display, likewise contribute to the enhanced insensitivity to magnetic fields. In the survey meter 10 as shown in the circuit diagram of FIG. 1, ferromagnetic materials are almost completely avoided.

Optionally, a spectrometer functionality can be added so that the survey meter 10 can perform gamma spectroscopy. As shown in FIG. 1, the spectrometer functionality can be implemented by means of a fast pulse stretcher 60 and an analog-to-digital converter 62, which provide a spectroscopy signal from the output of the AC-coupled low pass filter 30 to the microcontroller 40. The fast pulse stretcher 60 and the analog-to-digital converter 62 may be placed in the control unit 14; and may be provided as separate units or may be incorporated into the microcontroller 40.

Contamination measurements can be achieved by a specific probe using an appropriate scintillator (such as CsI, BGO or plastic) and a windowless or thin window configuration.

An automatic correction to compensate for the temperature drift of the detector response may likewise be provided. The bias voltage tracks the breakdown voltage drifts due to the detector temperature variations in order to keep the "overvoltage" (and the gain) independent of the temperature at the first order approximation.

Metal filters may be provided at the scintillator crystal 16 to reduce the energy dependence of the detector response.

The survey meter 10 is capable of detecting and measuring radioactivity in materials or detecting alpha, beta and gamma emissions from radioactive sources in the presence of a high magnetic field with very fast response rates. The inventors found that photon energies between 45 keV and 1.3 MeV and equivalent dose rates in the range of a fraction of μSv per hour to a few mSv per hour may be reliably detected, irrespective of the external magnetic field.

Figure 2:
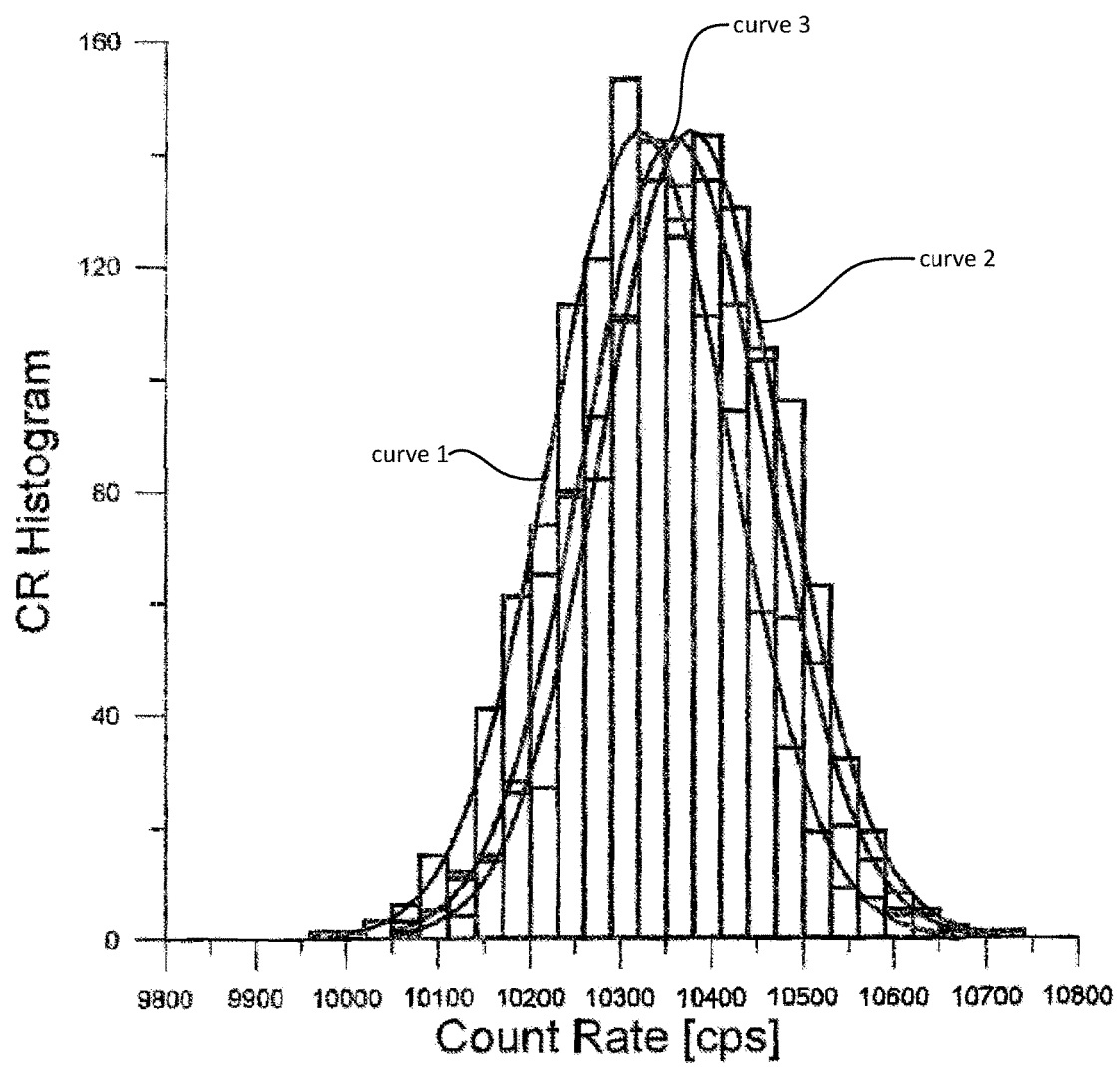
FIG. 2 shows counting statistics obtained with a portable radiation detection device according to an embodiment of the present invention both with and without a magnetic field.
Figure 3:
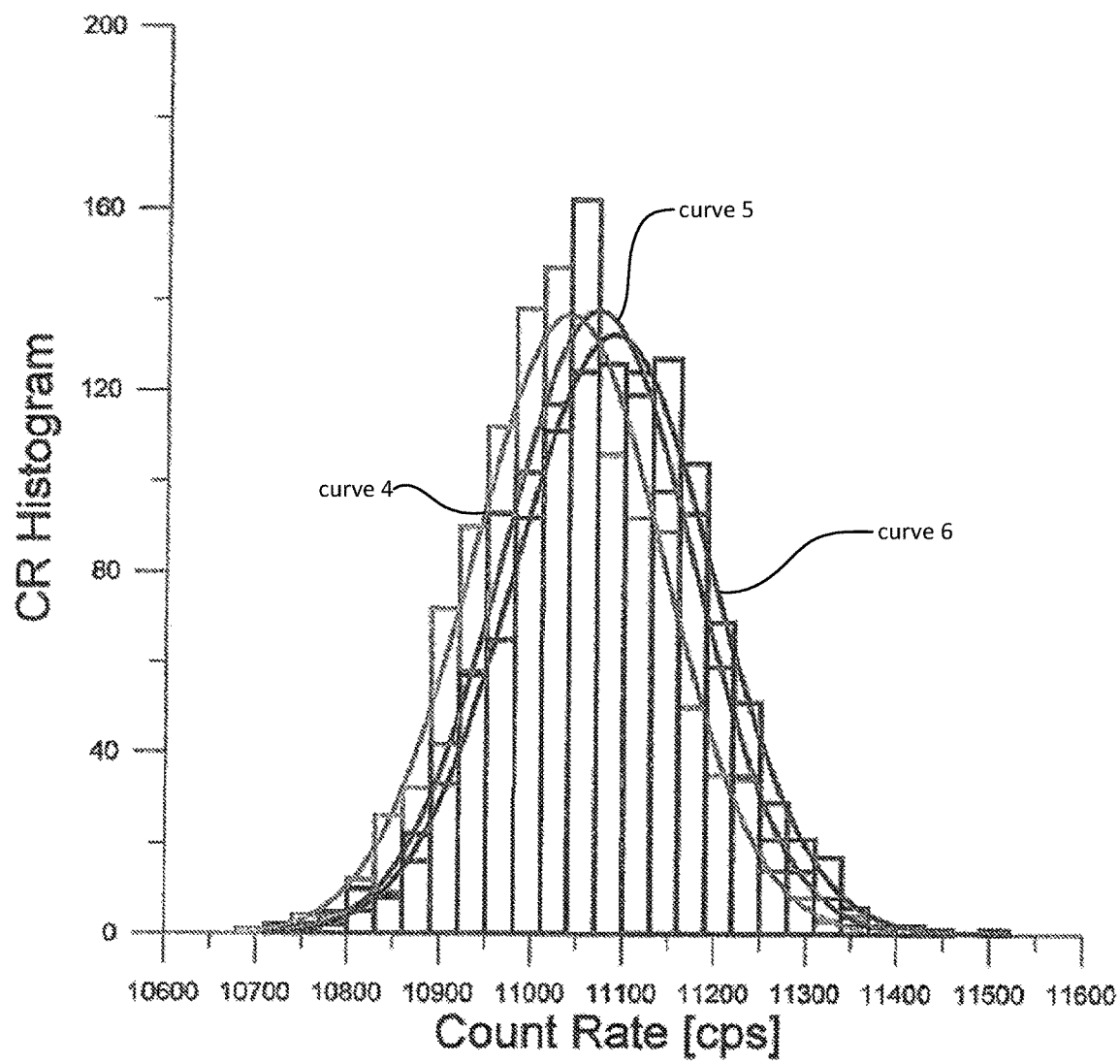
FIG. 3 shows counting statistics obtained with a portable radiation detection device according to an embodiment of the present invention in magnetic fields of varying strengths.

Exemplary experimental results that illustrate the insensitivity to external magnetic fields are shown in FIGS. 2 and 3. FIG. 2 is a count rate histogram that shows the distribution of count rates obtained from a sample source. Curve 1 shows the counts in the absence of an external magnetic field, whereas curve 2 shows counts that have been obtained when both the handheld detector unit 12 and the control unit 14 are placed in a high magnetic field of approximately 1 Tesla. The intermediate curve 3 shows the count rates in a test in which only the handheld detector unit 12 is placed inside a high magnetic field of approximately 1 Tesla, whereas the control unit 14 is placed outside the magnetic field (0 Tesla).

As can be taken from a comparison of curves 1, 2 and 3, the deviations of the sample rate are insignificant. These results confirm that the survey meter 10 is highly insensitive to an ambient magnetic field.

FIG. 3 shows a similar counting rate histogram, but based on counting statistics acquired when the survey meter 10 is placed in an external magnetic field of varying field strengths. Curve 4 corresponds to a magnetic induction of 0.3 Tesla, whereas curve 5 corresponds to 0.6 Tesla and curve 6 again to 1 Tesla. The counting rate time base for the measurements shown in FIG. 3 are 1 second, and the measurement lasted 1200 seconds. Again, no significant variation in the count rate appears, which confirms that the survey meter 10 performs reliably over a wide range of different magnetic inductions.

The portable radiation detection device according to the present invention is not only well-versed for radiation surveys at particle accelerators, such as those used in research and in industrial and medical applications. The device may also be used when conducting radiation surveys at medical positron emission tomography/magneto-resonance imaging scanners, where radioactivity is handled and administered to patients in the presence of high-magnetic fields.

Another context for an application of the portable radiation detection device is a particle accelerator coupled to magnetic-resonance-imaging scanners for image-guided radiation therapy.

Further applications may involve the magnetic separation in industrial mineral processing, where a separation of magnetic particles is required for various purposes in the processing of ferromagnetic materials. Natural radioactivity is present in these applications, and the potential presence of orphan sources may be a concern and require radiation monitoring.

The invention can also be useful at scrap dealerships to detect the radioactive contamination of scrap metals with orphan sources.

Fire brigades can use the portable radiation detection device according to the invention when called to intervene in unknown environments where radioactive sources may be present together with high magnetic fields.

Radioactive contamination monitoring in continuous casting of steel and other metals where a magnetic field is used to ensure quality of the casting process, is another promising application. Radioactive contamination monitoring in magnetic convection control for the molten silicon in the crucible of a Czochralski crystal-growing process can also benefit from the survey meter of the present invention.

REFERENCE SIGNS 10 survey meter
12 handheld detector unit/probe unit of survey meter 10
14 readout unit/control unit of survey meter 10
16 scintillator crystal
18 Silicon photomultiplier
20 incident radioactive radiation 22 bias voltage regulator
24 bias voltage input of Silicon photomultiplier 18
26 photocurrent signal output of Silicon photomultiplier 18
28 large-bandwidth amplifier
30 AC-coupled low pass filter
32 discriminator
34 output pulse train
36 data connection
38 counter unit
40 microcontroller
42 LCD display unit
44 LED display unit
46 data interface
48 data interface connection
50 power supply unit
52 power cable connection
54 battery monitor and recharger circuit
56 voltage regulator
58 supply line
60 fast pulse stretcher
62 analog-to-digital converter

The invention claimed is:

1. A portable radiation detection device (10), comprising:
   a detector unit (12) comprising a scintillator (16) and a photomultiplier (18) coupled to said scintillator (16), said photomultiplier (18) comprising an array of avalanche photodiodes;
   a control unit (14) comprising control circuitry (38, 40, 50, 56) electrically coupled to said photomultiplier (18);
   wherein said control unit (14) comprises a high-voltage power supply unit (50), wherein said high-voltage power supply unit (50) comprises a voltage multiplier circuit, and wherein said detector unit (12) comprises a low-drop voltage regulator unit (22) coupled to said voltage multiplier circuit.

2. The device (10) according to claim 1,
   wherein said detector unit (12) and/or said control unit (14) does not comprise ferromagnetic material.

3. The device (10) according to claim 1, wherein said photomultiplier comprising said array of avalanche photodiodes is a silicon photomultiplier (18).

4. The device (10) according to claim 1, wherein said detector unit (12) and/or said control unit (14) are adapted to detect ionizing radiation at an energy range of 45 keV or more, and/or at an energy range of 1.3 MeV or less.

5. The device (10) according to claim 1, wherein said scintillator (16) comprises Lanthanum bromide, $LaBr_3$.

6. The device (10) according to claim 1, wherein said detector unit (12) comprises an amplifier circuit (28) electrically coupled to an output of said photomultiplier (18).

7. The device (10) according to claim 6, wherein said detector unit (12) further comprises a filter unit (30) coupled to an output of said amplifier circuit (28), said filter unit (30) in particular comprising an AC-coupled low-pass filter.

8. The device (10) according to claim 7, wherein said detector unit (12) further comprises a discriminator unit (32) electrically coupled to an output of said filter unit (30).

9. The device (10) of claim 8, wherein said discriminator unit (32) comprises a digital pulse stretcher.

10. The device (10) of claim 7, wherein the AC-coupled low-pass filter is a Sallen-Key filter.

11. The device (10) of claim 6, wherein said amplifier unit (2) is a current-feedback operational amplifier (28).

12. The device (10) of claim 6, wherein the amplifier circuit (28) is electrically coupled to the output of said photomultiplier (18) with a gain in the range of 3 to 30 dB.

13. The device (10) according to claim 1, wherein said voltage multiplier circuit comprises a voltage multiplier cascade, in particular a voltage multiplier ladder network comprising capacitors and diodes.

14. The device (10) of claim 13, wherein the voltage multiplier circuit is a Cockcroft-Walton circuit.

15. The device (10) according to claim 1, wherein said high-voltage power supply unit (50) is battery-powered.

16. The device (10) according to claim 1, wherein said control unit (14) comprises a display unit, wherein said display unit comprises both an LCD display unit (42) and an LED display unit (44), wherein said LCD display unit (42) and said LED display unit (44) are electrically coupled to said control circuitry, and wherein said control circuitry is adapted to actuate either said LCD display unit (42) or said LED display unit (44) to display an output signal representative of the incident radiation.

17. The device (10) according to claim 16, wherein said LCD display unit (42) or said LED display unit (44) is actuated selectively depending on a detected presence of an external magnetic field.

18. The device (10) according to claim 1, wherein said control unit (14) comprises an external data interface (46).

19. A portable radiation detection device (10), comprising:
   a detector unit (12) comprising a scintillator (16) and a photomultiplier (18) coupled to said scintillator (16), said photomultiplier (18) comprising an array of avalanche photodiodes;
   a control unit (14) comprising control circuitry (38, 40, 50, 56) electrically coupled to said photomultiplier (18);
   wherein said control circuitry comprises a counter unit (38) electrically coupled to said photomultiplier (18), and a microcontroller unit (40) coupled to said counter unit (38).

* * * * *